Aug. 16, 1949.　　M. W. MOORE　　2,479,503
BRAKE FLUID LEVEL WARNING DEVICE
Filed May 15, 1947
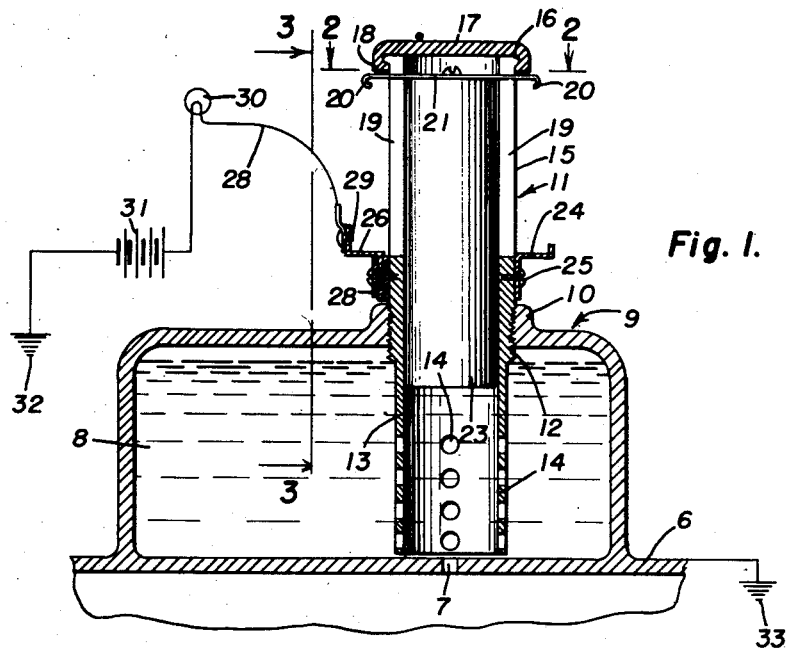
Fig. 1.
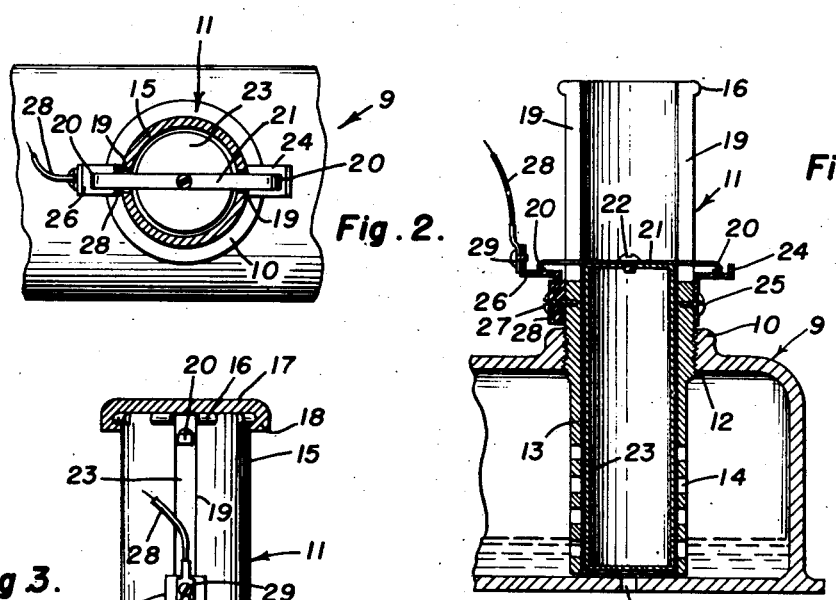
Fig. 2.
Fig. 4.
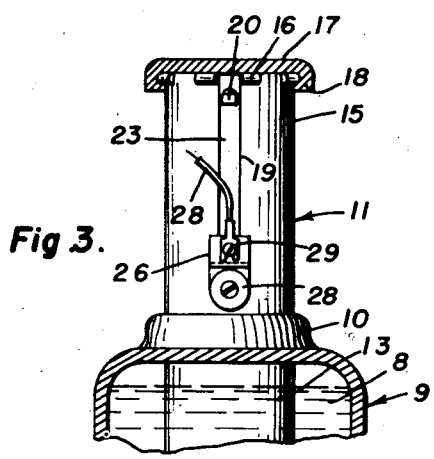
Fig 3.
Inventor
Milton W. Moore
By Clarence A. O'Brien
and Harvey B. Jackson
Attorneys Patented Aug. 16, 1949

2,479,503

UNITED STATES PATENT OFFICE 2,479,503

BRAKE FLUID LEVEL WARNING DEVICE

Milton W. Moore, Island Heights, N. J.

Application May 15, 1947, Serial No. 748,197

2 Claims. (Cl. 200—84)

The present invention relates to automotive accessories and the like, generally classified, but has more specific reference to a float controlled circuit make and break device which is suitably constructed and properly mounted to provide a signaling and warning device for motorists, to put the driver on guard when the supply of brake fluid in the hydraulic brake system has reached an unpredictable point of operativity.

One object of the invention is to provide a circuit make and break device which serves automatically to bring the warning signal into play and which is of a simple and practical type and is so made that it may be fitted into the existing or stock filler hole in the regular or standard-type master cylinder reservoir.

More specifically, in carrying out the preferred embodiment of the invention I contemplate the use of a simple and expedient sleeve, the same having its central portion threaded to screw into the aforementioned filler hole of the said reservoir, the upper half portion of the sleeve projecting above the reservoir and being provided with a detachable closing cap, and otherwise constructed to accommodate a float which slides up and down in the said sleeve. It follows that by having the upper protruding or extending portion of the sleeve thus arranged, facilities are consequently provided to permit unobstructed filling of the reservoir without removing the safety signaling device.

In addition the novelty is also predicated upon the upper protruding portions of the float accommodating sleeve or tube, this in such a manner that the circuit make and break elements are of simple and readily accessible form.

Other objects and advantages of the invention will become more readily apparent from the following description and the accompanying illustrative drawings.

In the drawings, wherein like numerals are employed to designate like parts throughout the views:

Figure 1 is a view partly in section and partly in elevation showing the reservoir and master cylinder in fragmentary section and illustrating the attachment applied to the reservoir;

Figure 2 is a horizontal section of the line 2—2 of Figure 1, looking in the direction of the arrows;

Figure 3 is a vertical fragmentary sectional view on the line 3—3 of Figure 1, also looking in the direction of the arrows; and Figure 4 is a view similar to Figure 1 with the float in section and with the cap removed from the upper end of the float sleeve.

Referring now to the drawings by reference numerals the body of the master cylinder in Figure 1 is denoted by the numeral 6, the same having an intake port of orifice 7 through which the brake fluid 8 is fed to be forced into the brake system by brake pedal control (not shown) in the customary manner. The extra or reserve supply of brake fluid is carried in the reservoir 9 which is the usual type and is provided with a filler neck 10 internally screw threaded. To accommodate the invention the usual screw plug is removed and the invention, as an attachment, is substituted therefor. The attachment comprises a vertically elongated sleeve denoted by the numeral 11. This has a central portion internally screw threaded as at 12 and the threaded portion is connected with the filler neck 10. The lower half portion 13 of the sleeve protrudes into the oil space of the reservoir and said portion is provided with a plurality of circulating and intake ports 14. The upper half portion 15 protrudes above the reservoir and is open at its top and provided with circumferentially spaced detents 16 to hold in place the rubber cap 17, this through the medium of a suitable lip or attention rim 18. The protruding upper half portion of the sleeve is also provided with diametrically opposite slots 19 which serve to accommodate the hooked end portions 20 of a circuit make and break clip or bar 21. This bar is fastened by a screw or the like to the upper end of a float 23 which is operable in the sleeve, thus permitting the sleeve to serve as a float containing and guiding chamber. The sleeve is of metal and a substantially L-shaped contact clip 24 is fastened as at 25 to one side of the protruding portion in alignment with the above slots 19 and a similar contact clip 26 is provided on a diametrically opposite side and this is secured as at 27 by way of insulating means 28 to the opposed body portion. A circuit wire 28 is provided and this is secured as at 29 to the clip. The circuit wire serves to operate a suitable signal bulb or alarm 30 connected by a wire to the battery 31, grounded at 32. The opposite ground is indicated at 33 in Figure 1. The open and closed positions are represented in Figures 1 and 4 as for example in Figure 1 receive the brake fluid 8 substantially filling the reservoir 9 when at this stage the brakes, so far as fluid supply is concerned, are in a good operable shape. When, however, because of leakage or shrinkage, or other causes the brake fluid is lost in the master cylinder, it is bled then from the reservoir into the master cylinder and when the remaining supply is low as shown in Figure 4 the float 23, which is normally up as seen in Figure 1, drops down to the position shown in Figure 4. At this stage the down-turned or hooked ends of the contact strip 20 bridge the contact clips 24 and 26. It follows that the circuit is closed in Figure 4, and, therefore, the signaling or warning light 30 is illuminated and if desired this light may be on the instrument panel of a car and, furthermore, may be associated with an illuminated panel carrying some sort of a legend such as "Stop! Brake fluid out."

In the drawings the sleeve and float and other chief parts are metal. I desire to point out, however, that the parts may be of plastic and in such cases the insulation shown to the left in Figure 1 would not necessarily have to be employed. But in structure, and I am interested more in the structure than in the materials, the alternate plastic or composition form of the device would be the same as that disclosed.

It is to be noted that the cap 17 may be snapped on and off and that when it is off the float may then be removed and consequently the reservoir will be accessible for replenishing the supply of brake fluid. In almost all other devices of this category it is necessary to completely remove or dismantle the signaling means for the purpose of replenishing the supply of fluid.

Changes in shape, size, materials and rearrangement of details and parts may be resorted to in actual practice, so long as they do not depart from the spirit of the invention or the scope of the appended claims, as is well understood.

Having described my invention, what is claimed as new is:

1. A brake fluid level warning device adapted for attachment to a master cylinder reservoir and functioning to operate either a visible or audible signal on the usual instrument panel of a vehicle comprising an elongated sleeve, the central exterior portion of said sleeve being externally screw threaded, one half portion of the sleeve being apertured to provide a float accommodation cage, the other half portion of the sleeve being provided with diametrically opposite slots extending from said screw-threaded portion through one end of said sleeve, the last named half portion terminating in a filler end and having detents, a closing cap for the last named end, said cap being provided with a snap rim engageable with said detents, a float slidable in said sleeve, a contact bar secured to one end of said float, said bar having its end portions extending outwardly through and beyond said slots, and circuit make and break clips secured to the intermediate portions of said sleeve and in alignment with said slots, said contact bar adapted to bridge said contacts for circuit make and break purposes.

2. A brake fluid level warning device adapted for attachment to a master cylinder reservoir and functioning to operate either a visible or audible signal on the usual instrument panel of a vehicle comprising a cylindrical sleeve, open at opposite ends, the inner end portion of said sleeve being apertured and adapted to depend into the stated reservoir, the upper end portion of said sleeve being provided with a pair of diametrically opposite guide slots, said slots opening at their ends through the upper end of said upper end portion, the intermediate portion of said sleeve, adjacent the inner ends of said slots, being externally screw-threaded, circuit make and break clips secured externally to the intermediate portion of said sleeve and located exteriorly of the sleeve and in alignment with the inner end portions of said slots, a float slidable in said sleeve, a contact bar fastened to the upper end of said float, the outer end portions of said contact bar extending through and beyond said slots and being adapted, under certain conditions, to rest upon and bridge said contact clips, and a removable cap closing the upper end of said sleeve and also the upper ends of said slots.

MILTON W. MOORE.

REFERENCES CITED

The following references are of record in the file of this patent:

UNITED STATES PATENTS

| Number | Name | Date |
|---|---|---|
| 1,051,245 | Marchal | Jan. 21, 1913 |
| 1,326,578 | Curtis | Dec. 30, 1919 |
| 2,253,260 | Alcorn | Aug. 19, 1941 |